United States Patent [19]

Smith

[11] 4,047,381
[45] Sept. 13, 1977

[54] GAS TURBINE ENGINE POWER PLANTS FOR AIRCRAFT

[75] Inventor: Thomas Eric Smith, Ilkeston, England

[73] Assignee: Rolls-Royce (1971) Limited, London, England

[21] Appl. No.: 725,155

[22] Filed: Sept. 21, 1976

[30] Foreign Application Priority Data

Oct. 11, 1975 United Kingdom ............... 41751/75

[51] Int. Cl.² ............................................. F02K 3/02
[52] U.S. Cl. .................................. 60/226 A; 60/231;
239/265.23; 244/110 B; 60/224
[58] Field of Search ..................... 60/226 A, 231, 224;
239/265.23; 244/12 D, 23 D, 110 B

[56] References Cited

U.S. PATENT DOCUMENTS

| | | | |
|---|---|---|---|
| 3,605,411 | 9/1971 | Maison | 60/226 A |
| 3,660,981 | 5/1972 | Stevens | 239/265.23 |
| 3,729,934 | 5/1973 | Denning | 60/226 A |
| 3,736,750 | 6/1973 | Britt | 60/226 A |

*Primary Examiner*—Clarence R. Gordon
*Attorney, Agent, or Firm*—Cushman, Darby & Cushman

[57] ABSTRACT

Gas turbine engine power plants sometimes are provided with thrust reversing equipment, the outlet of which is close to the power plant air intake. Such arrangements create re-ingestion problems. There is described herein an apparatus which either maintains the upstream portion of reversed flow in a given position with respect to the plane of the air intake or alternatively destroys the reversed flow entirely.

4 Claims, 4 Drawing Figures

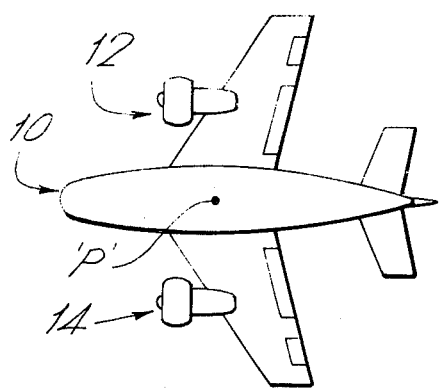
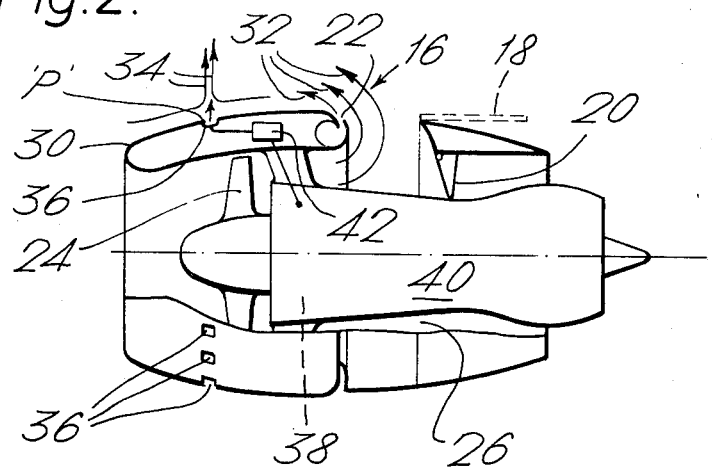
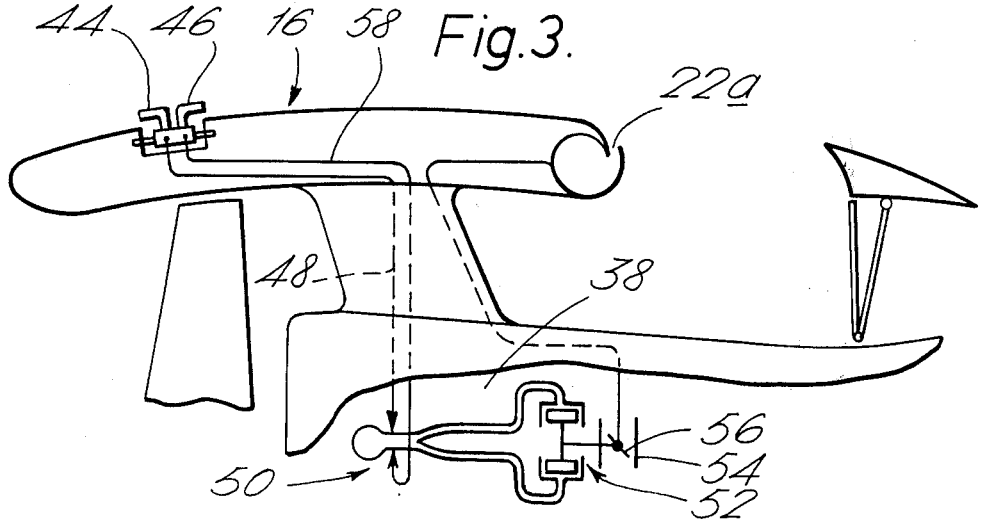

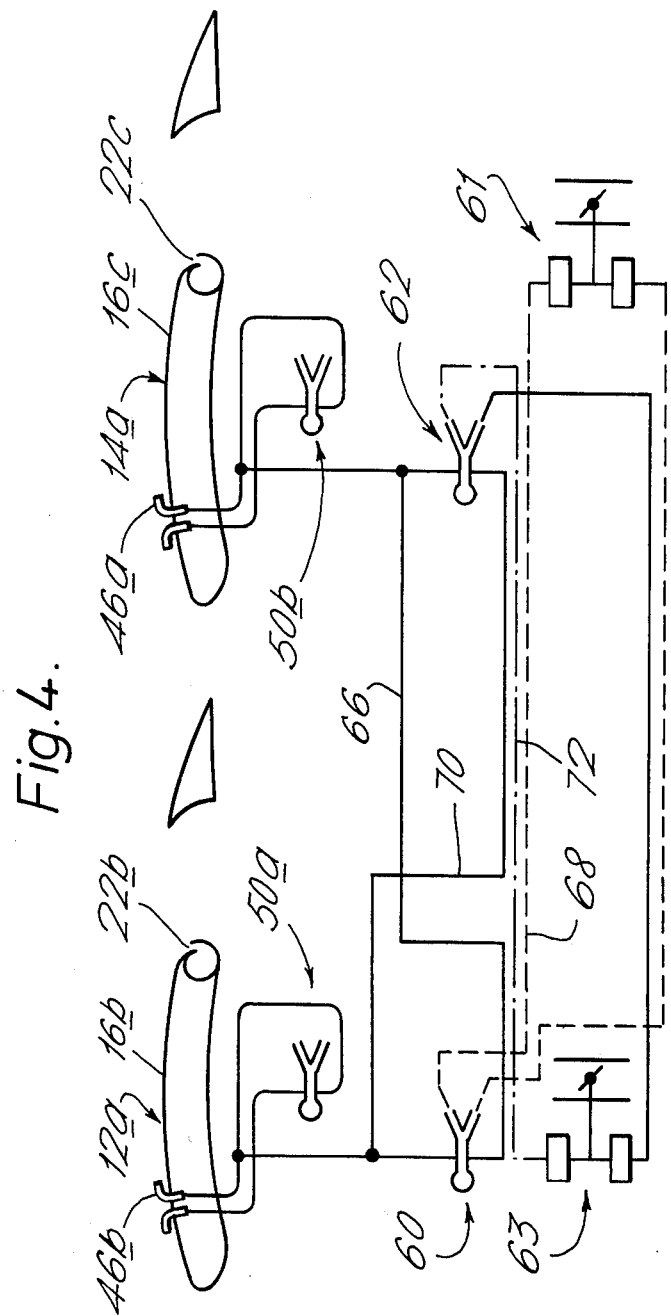

GAS TURBINE ENGINE POWER PLANTS FOR AIRCRAFT

This invention concerns gas turbine engine power plants for aircraft.

Some gas turbine engine power plants include a cowl which together with a core gas generator casing, comprises a duct through which fan air flows.

Thrust reverser apparatus is provided in the cowl so that the direction of flow of fan air can be reversed in order to retard the forward speed of the aircraft on which the engine is mounted and so reduce the distance required to land and stop.

The particular thrust reversing apparatus with which the present invention is concerned is of the type which utilizes the Coanda effect to improve the ability of the mechanical structure of the apparatus to turn the fan air in a direction opposite to its direction of flow through the fan duct. Thus fan air is deflected through an aperture in the cowl and a layer of air from a source other than the fan duct, is ejected over the upstream lip of the aperture and travels upstream in connection with the cowl outer surface and in so doing, entrains the air from the aperture.

As an aircraft powered by engines of the kind described herein, lands, the thrust reversing system is switched in, fan air is projected forwardly by the thrust reversing system and this immediately creates an interface between the forwardly flowing fan air and the relatively rearwardly flowing ambient free air stream through which the aircraft is travelling. Adjacent to the cowl the interface is normal to the cowl surface.

That point on the cowl outer surface where the interface is created, is an area of high static pressure, caused by the collision between the two flows. This seperates both flows off the cowl at that point, which is called the stagnation point. However, as aircraft forward speed reduces, so does the relative velocity of the ambient free stream, and thus the reverse thrust pressure becomes dominant with the result that the interface moves upstream towards the lip of the air intake of the fan thereby creating the danger of reingestion of the reversed fan flow with consequent loss of thrust reversal and overheating of the fan blades.

It is an object of this invention to prevent advancement of the air flow interface to the lip of the fan air intake.

It is a further object of this invention to obviate asymmetric thrust reversal in an aircraft powered by a plurality of ducted fan gas turbine engines.

Accordingly the present invention comprises a gas turbine engine power plant including a thrust reverser capable of directing a reversed flow of air along an exterior surface of a cowl of the power plant whereby to effect reverse thrust and thereby generate a mobile high pressure area on the cowl exterior surface, at the interface of forward flowing reversed airflow and ambient air, mobile high pressure area sensing means and mobile high pressure area stabilising means whereby in operation, said sensing means senses the pressure in the mobile high pressure area and as a result, actuates the mobile high pressure area stabilising means so as to stabilise the position of the mobile high pressure area with respect to a point on said cowl.

The invention also comprises an aircraft having at least two gas turbine engine power plants as described hereinbefore, wherein the mobile high pressure area pressure sensing means of one power plant is connected to actuate the mobile high pressure area stabilising means of the other power plant.

The invention will now be described by way of example, with reference to the accompanying drawings in which:

FIG. 1 is a diagrammatic view of an aircraft,

FIG. 2 is a diagrammatic view of a ducted fan gas turbine engine which powers the aircraft of FIG. 1, FIG. 3 is a diagrammatic part view of a ducted fan gas turbine engine, and FIG. 4 is a diagrammatic part view of a further ducted fan gas turbine engine.

In FIG. 1 an aircraft 10 is powered by a pair of ducted fan gas turbine engines 12, 14 is known manner. The ducted fan gas turbine engines are also of known type and their general construction and operation will not be described.

Aircraft 10 has a yaw axis which passes through point 'P'.

Referring now to FIG. 2 which is representative of both engines 12 and 14, thrust reversing equipment 16, comprising a translatable cowl portion 18, fan duct blocker doors 20 and a "Coanda" nozzle 22, are all arranged to cooperate with each other in known manner to cause air which has been worked upon by fan 24 in fan duct 26 to pass radially outwardly of the fan duct via an aperture 28, and flow forwardly of the fan cowl 30 with respect to the direction of movement of the aircraft, in the direction of arrows 32 and under the influence of the phenomenon known as the "Coanda" effect.

On meeting the free, ambient airstream which in effect, is moving in a downstream direction relative to the flow of gases through the engine and which is adhering to the outer surface of the fan cowl, the reversed fan air and ambient air collide with resultant loss of velocity and creation of an area of high static pressure at positions on and adjacent point 'P' on the fan cowl. Both flows separate from the cowl outer surface in the direction of arrows 34.

As stated hereinbefore, the thrust reversers are brought into action when the aircraft lands and as aircraft forward speed reduces, the reversed air flow dominates the ambient airstream with the result that the high pressure area at the interface of the two streams moves forwardly along cowl 30. However, when the high pressure area reaches a preselected position peripherally of the cowl, it acts upon a pressure change sensing mechanism 36, which comprises a plurality of valves which are urged by springs (not shown), into a position in which they prevent compressed air escaping from the compressor 38 of the core gas generator 40 in a direction radially outwardly of cowl 30 via a conduit and pressure adjusting mechanism 42. The rise in pressure experienced by the valves overcomes the action of the springs and pushes them from their seats (not shown), with the result that a peripheral curtain of compressed air spills radially out of the cowl and supplements the effect of the reducing cowl ambient air flow by ensuring that reversed fan air separates from cowl 16, in and adjacent the plane containing point 'P' at the aforementioned preselected position. Thus, re-ingestion of the reversed air is prevented.

FIG. 3 depicts an alternative means of controlling the maximum point of advancement of the reversed fan air and thus the high pressure area, along cowl 16 and comprises a pair of opposed pitot tubes, one of which 44 is forwardly facing to receive ambient air flow and the other of which, 46, is facing downstreams to receive reversed air. Pitot tubes 44 passes ambient air via a conduit 48, to one side of a fluidic device 50 so that whilst ambient air flow dominates reversed air flow, the fluidic device will be caused to direct compressed air from compressor 38 to the upper end of a double ended piston 52 and act upon it to maintain a butterfly valve 54 to which the piston is connected, in an open position in a conduit 56. This enables a further supply of compressed air to be made to Coanda flow inducing nozzle 22a so that full thrust reversal is attained. On reduction of aircraft forward speed and consequent domination by reversed air, pitot tube 46 will pass reversed air via conduit 58, to the opposite side of fluidic device 50, whereupon compressed air will act upon the lower end of piston 52 and cause it to rotate butterfly valve 54 so as to reduce the further flow of compressed air in conduit 56, thus weakening the Coanda flow effect by reducing the flow from nozzle 22a.

FIG. 4 includes the arrangement as described for FIG. 3, but includes further fluidic devices 60, 62 coupled to the fluidic devices of FIG. 3 and a pair of gas turbine ducted fan engines 12a, 14a. Thus fluidic devices 50a of FIG. 4 acts as does fluidic device 50 in FIG. 3. Similarly fluidic device 50b acts as does fluidic device 50. However the reversed air conduit 58a of cowl 16b is connected to one side of further fluidic device 60 and to the opposite side of further fluidic device 62. Similarly the reversed air conduit of cowl 16c is connected to the remaining side of fluidic device 60 and to the remaining side of fluidic device 62.

Fluidic device 60 is connected to each end of a piston and butterfly valve assembly 61 in the engine surrounded by cowl 16c. Similarly, fluidic device 62 is connected to each end of a piston and butterfly valve assembly 63 in the engine surrounded by cowl 16b. Thus whilst the pressures sensed by the reversed air pitot tubes on the respective engines are substantially identical, the forces exerted on each end of the pistons from fluidic devices 60, 62 will be identical and therefore mullified. However, should say, the reverser mechanism operating the reverser on the ducted fan gas turbine engine enclosed by cowl 16b break down, air tapped from pitot tube 46a on the engine within cowl 16c, which is connected to fluidic device 60 via a full line 66, will bias the compressed air flowing through device 60 into the pipe which is connected to the upper end of the piston is assembly 61 via dotted line 68, thereby closing the butterfly valve and shutting off the compressed air supply to Coanda nozzle 22c. Thus both reversers are now inoperative and asymmetric reverse thrust is avoided or obviated. Similarly, if the engine enclosed by cowl 16c loses its thrust reverser, air tapped from pitot tube 46b is passed via line to fluidic device 62 to bias compressed airflow therethrough, to the upper end of the piston in assembly 63, via line 72 so as to shut off the compressed air supply to Coanda nozzle 22b.

The fluidic devices described in this example may be replaced by electrical, mechanical or electronic means or combinations thereof for conversion of the pressure signals from the pitot tubes to control inputs to vary the amount of Coanda airflow.

What we claim is:

1. A gas turbine engine power plant including a thrust reverser capable of directing a reversed flow of air along an exterior surface of a cowl of the power plant whereby to effect reverse thrust and thereby generate a mobile high pressure area on the cowl external surface, at the interface of forward flowing reversed airflow and ambient air, mobile high pressure area sensing means and mobile high pressure area stabilising means whereby in operation, said sensing means senses the pressure change which occurs as the mobile high pressure area reaches it and actuates the mobile high pressure area stabilising means so as to stabilise the position of the mobile high pressure area with respect to a point on said cowl.

2. A gas turbine engine power plant as a claimed in claim 1 wherein the sensing means and stabilising means, in combination comprise at least one valve arranged in said cowl at the stabilising position and a compressed air supply, the combination being arranged such that when the high pressure of said mobile high pressure area acts on said at least one valve, the at least one valve is opened and releases a flow of compressed air therethrough, radially outwardly of the cowl and into the mobile high pressure area, thus preventing further progress of the high pressure area upstream of the cowl.

3. A gas turbine engine power plant as claimed in claim 1 wherein the sensing means and stabilising means in combination comprise at least one pair of pitot tubes respectively positioned on said cowl to receive pressure loads from ambient and reversed airflows, a fluid logic device, a double headed piston and a valve the arrangement thereof being such that the dominant pressure load acts via one of said pitot tubes to cause the fluid logic device to direct fluid to one head of said double headed piston, which in turn moves and manipulates said valve to effect control of flow rate of a "Coanda effect" inducing airflow out of the reverser "Coanda" nozzle so as to affect the efficiency of the Coanda effect over the upstream portion of the cowl.

4. A gas turbine engine power plant as claimed in claim 3 and a further gas turbine engine powerplant identical therewith, both said gas turbine engine powerplants being adapted for mounting one on each side of an aircraft so that in normal operation, they provide thrust for forward flight wherein each gas turbine engine powerplant includes a further fluid logic device, piston and valve arrangement and wherein each fluid logic device is connectable to receive, in operation, a reversed air pressure load on one side thereof from its own powerplant and a reversed air pressure load its other side from the other powerplant, such that if in said operation, the reverser system of one gas turbine engine powerplant fails, the reversed air pressure loads exerted by the reverser system, on the remaining gas turbine engine powerplant acts via both fluid logic device and pistons on both valves to close them, resulting in obviating of the operation of the reverser system of said remaining gas turbine engine powerplant and avoidance of asymmetric reverse thrust.

* * * * *

UNITED STATES PATENT OFFICE
CERTIFICATE OF CORRECTION

Patent No. 4,047,381  Dated September 13, 1977

Inventor(s) Thomas Eric Smith

It is certified that error appears in the above-identified patent and that said Letters Patent are hereby corrected as shown below:

In the above-identified patent, please change "[73] Assignee: Rolls-Royce (1971) Limited, London, England" to --"[73] Assignee: Rolls-Royce Limited, London, England"--.

Signed and Sealed this

Sixth Day of December 1977

[SEAL]

Attest:

RUTH C. MASON  
Attesting Officer

LUTRELLE F. PARKER  
Acting Commissioner of Patents and Trademarks